(12) United States Patent
Sishtla et al.

(10) Patent No.: US 11,754,706 B2
(45) Date of Patent: Sep. 12, 2023

(54) AGILE ANTENNA TAPER BASED ON WEATHER RADAR FEEDBACK

(71) Applicant: Rockwell Collins, Inc., Cedar Rapids, IA (US)

(72) Inventors: Venkata A. Sishtla, Cedar Rapids, IA (US); James B. West, Cedar Rapids, IA (US); Jiwon L Moran, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 208 days.

(21) Appl. No.: 17/023,774

(22) Filed: Sep. 17, 2020

(65) Prior Publication Data

US 2022/0082687 A1     Mar. 17, 2022

(51) Int. Cl.
*G01S 13/95* (2006.01)
*G01S 7/41* (2006.01)
*G01S 7/28* (2006.01)

(52) U.S. Cl.
CPC ............ *G01S 13/958* (2013.01); *G01S 7/414* (2013.01); *G01S 13/953* (2013.01); *G01S 7/2813* (2013.01)

(58) Field of Classification Search
CPC ...... G01S 13/958; G01S 7/414; G01S 13/953; G01S 7/2813
See application file for complete search history.

(56) References Cited

U.S. PATENT DOCUMENTS 4,246,585 A     1/1981 Mailloux
4,939,523 A *   7/1990 Jehle ..................... H01Q 19/02
                                              343/705

(Continued)

FOREIGN PATENT DOCUMENTS

EP    0808463 B1   5/2000
GB    2504252 B    7/2014

OTHER PUBLICATIONS

Curtis Christopher D et al: "Adaptive Nullforming to Mitigate Ground Clutter on the National Weather Radar Testbed Phased Array Radar", IEEE Transactions on Geoscience and Remote Sensing, IEEE, USA, vol. 54, No. 3, Mar. 1, 2016 (Mar. 1, 2016), pp. 1282-1291, XP011608498, ISSN: 0196-2892, DOI: 10.1109/TGRS.2015.2477300 [retrieved on Feb. 29, 2016].

(Continued)

*Primary Examiner* — Peter M Bythrow
*Assistant Examiner* — Nazra Nur Waheed
(74) *Attorney, Agent, or Firm* — Suiter Swantz pc llo

(57) ABSTRACT

A system and method for applying an adaptive adjustment or taper to an electronically scanned array (ESA) weather radar based on feedback from the weather radar. To minimize ground clutter and enable the ESA to display hazardous weather phenomena, the system adaptively adjusts amplitude and phase of ESA elements to adjust the far field pattern shape and sidelobes to maintain a desirable signal to clutter ratio. The system identifies ground clutter as a strong ground return over several azimuths depending on the radar beamwidth. Once the system IDs the ground clutter, it adaptively adjusts on receive for for the upcoming azimuths. The system selectively suppresses sidelobe echoes while maintaining the signal to noise (SNR) for weather targets. The system adaptively adjusts in real time as well as adjusting using precomputed historically accurate tapers stored in memory.

15 Claims, 7 Drawing Sheets

(56) References Cited

U.S. PATENT DOCUMENTS

| | | | | |
|---|---|---|---|---|
| 5,124,712 A | * | 6/1992 | Caille | H01Q 21/0025 |
| | | | | 342/368 |
| 5,128,683 A | * | 7/1992 | Freedman | H01Q 3/26 |
| | | | | 342/158 |
| 5,929,810 A | * | 7/1999 | Koutsoudis | H01Q 3/2605 |
| | | | | 342/368 |
| 6,336,033 B1 | * | 1/2002 | Yamaguchi | H01Q 3/2605 |
| | | | | 455/562.1 |
| 7,737,879 B2 | | 6/2010 | Tietjen et al. | |
| 7,786,948 B2 | | 8/2010 | Webb et al. | |
| 9,019,145 B1 | * | 4/2015 | Sishtla | G01S 13/953 |
| | | | | 342/26 B |
| 9,568,590 B1 | | 2/2017 | Haupt et al. | |
| 9,680,234 B2 | | 6/2017 | Love et al. | |
| 2004/0196172 A1 | * | 10/2004 | Wasiewicz | G01S 13/913 |
| | | | | 342/33 |
| 2006/0176217 A1 | * | 8/2006 | Lewis | H01Q 21/0087 |
| | | | | 342/372 |
| 2009/0231195 A1 | | 9/2009 | Chang et al. | |
| 2012/0119952 A1 | * | 5/2012 | Pozgay | H01Q 3/01 |
| | | | | 342/372 |
| 2018/0259641 A1 | * | 9/2018 | Vacanti | G01S 13/953 |

OTHER PUBLICATIONS

Extended Search Report in European Application No. 21196841.7 dated Feb. 10, 2022, 11 pages.

\* cited by examiner

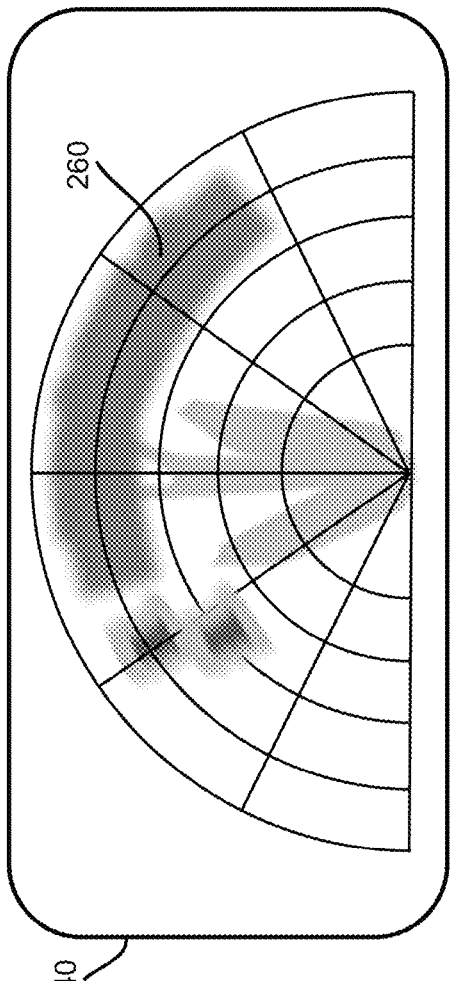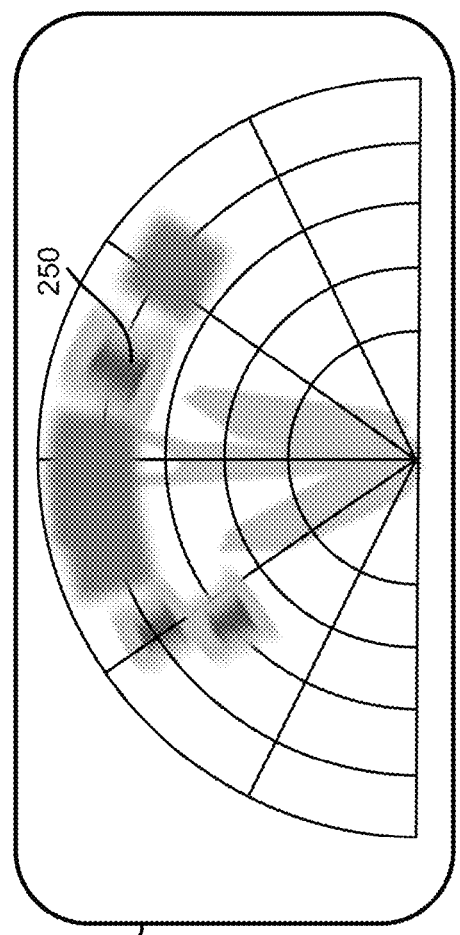
FIG. 2A
FIG. 2B

AGILE ANTENNA TAPER BASED ON WEATHER RADAR FEEDBACK

BACKGROUND

One threat to commercial aircraft safety may include severe weather while close to the ground. Specifically, a microburst encounter while at low altitude may cause an unrecoverable situation. During landing where and aircraft total energy state may be low with gear and flaps extended, a high angle of attack, and power at a reduced RPM during descent on a glideslope, commercial aircraft may be particularly vulnerable to the microburst and windshear threat.

A traditional airborne weather radar system antenna beam may be tilted toward the ground to attempt to illuminate display doppler returns from hazardous weather near the ground and intended landing airfield. However, while tilted downward, these traditional radars also display strong ground clutter which may preclude display of an actual weather threat.

For autonomous operation, detecting hazardous weather without flight disruption may be useful. Without further information, most operational directives may mandate discontinuing the landing to avoid any microburst threat. This may include a false microburst warning causing increased fuel consumption for additional flight time. For an electronically scanned array, ground clutter echoes may be exacerbated due to the higher sidelobe content.

Some methods of ground clutter suppression may be computationally extensive and require heavy, expensive computational assets carried on board the aircraft which may be cost prohibitive. Some systems may compute a ground clutter position via a space time adaptive processing but require extensive processing power and assets to perform the task.

Therefore, a need remains for a system and related method which may overcome these limitations and provide a lightweight novel solution onboard the aircraft enabling the weather radar to function as a sensor to minimize ground clutter and accurately display hazardous microburst weather phenomena.

SUMMARY

In one aspect, embodiments of the inventive concepts disclosed herein are directed to a system for discriminating a ground clutter return from a weather return. The system may comprise a weather radar onboard an aircraft, the weather radar including an electronically scanned array (ESA) antenna, the weather radar configured for reception of a weather radar data, the ESA having a plurality of elements. The system may further include a weather communication interface configured for receiving the weather radar data and configuring the weather radar data for recognition by an operator of the aircraft and a controller operatively coupled with each of the ESA and the weather radar.

For control, the system may include a tangible, non-transitory memory configured to communicate with the controller, the tangible, non-transitory memory having instructions stored therein that, in response to execution by the controller, cause the controller to carry out each task of the system for discriminating a ground clutter return from a weather return.

In function, the controller may receive the weather radar data and identify a ground clutter return within the received weather radar data based on a characteristic of the weather radar data associated with the ground clutter return. The system may determine a location relative to the aircraft of the ground clutter return based on the identification and command the ESA to adaptively adjust an amplitude and a phase of an element of the plurality of elements to manipulate 1) a far field radiation pattern and 2) a side lobe associated with the ESA, the adaptive adjustment creates a null associated with the ground clutter return, the adaptive adjustment maintains a signal to noise ratio (SNR) sensitivity of the weather radar to receive a weather return. The system may receive the weather return and display the weather return to the operator of the aircraft.

A further embodiment of the inventive concepts disclosed herein may include a method for discriminating a weather radar return from a surface return. The method may comprise receiving a weather radar data from an electronically scanned array (ESA) associated with a weather radar onboard an aircraft, the ESA having a plurality of elements and identifying a ground clutter return within the received weather radar data based on a characteristic of the weather radar data associated with the ground clutter return.

The method may further include determining a location relative to the aircraft of the ground clutter return based on the identification and adaptively adjusting an amplitude and a phase of an element of the plurality of elements of the ESA to manipulate a far field radiation pattern and a side lobe associated with the ESA, the adaptive adjusting creates a null associated with the ground clutter return, the adaptive adjusting maintains a signal to noise ratio (SNR) sensitivity of the weather radar to receive a weather return. The method may also include receiving the weather return and displaying the weather return to the operator of the aircraft.

It is to be understood that both the foregoing general description and the following detailed description are exemplary and explanatory only and are not necessarily restrictive of the inventive concepts as claimed. The accompanying drawings, which are incorporated in and constitute a part of the specification, illustrate embodiments of the inventive concepts and together with the general description, serve to explain the principles of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings in which

FIGS. 2A and 2B are diagrams of before and after ESA adaptive adjustment in accordance with an embodiment of the inventive concepts disclosed herein;

DETAILED DESCRIPTION OF EXEMPLARY EMBODIMENTS

Figure 1:
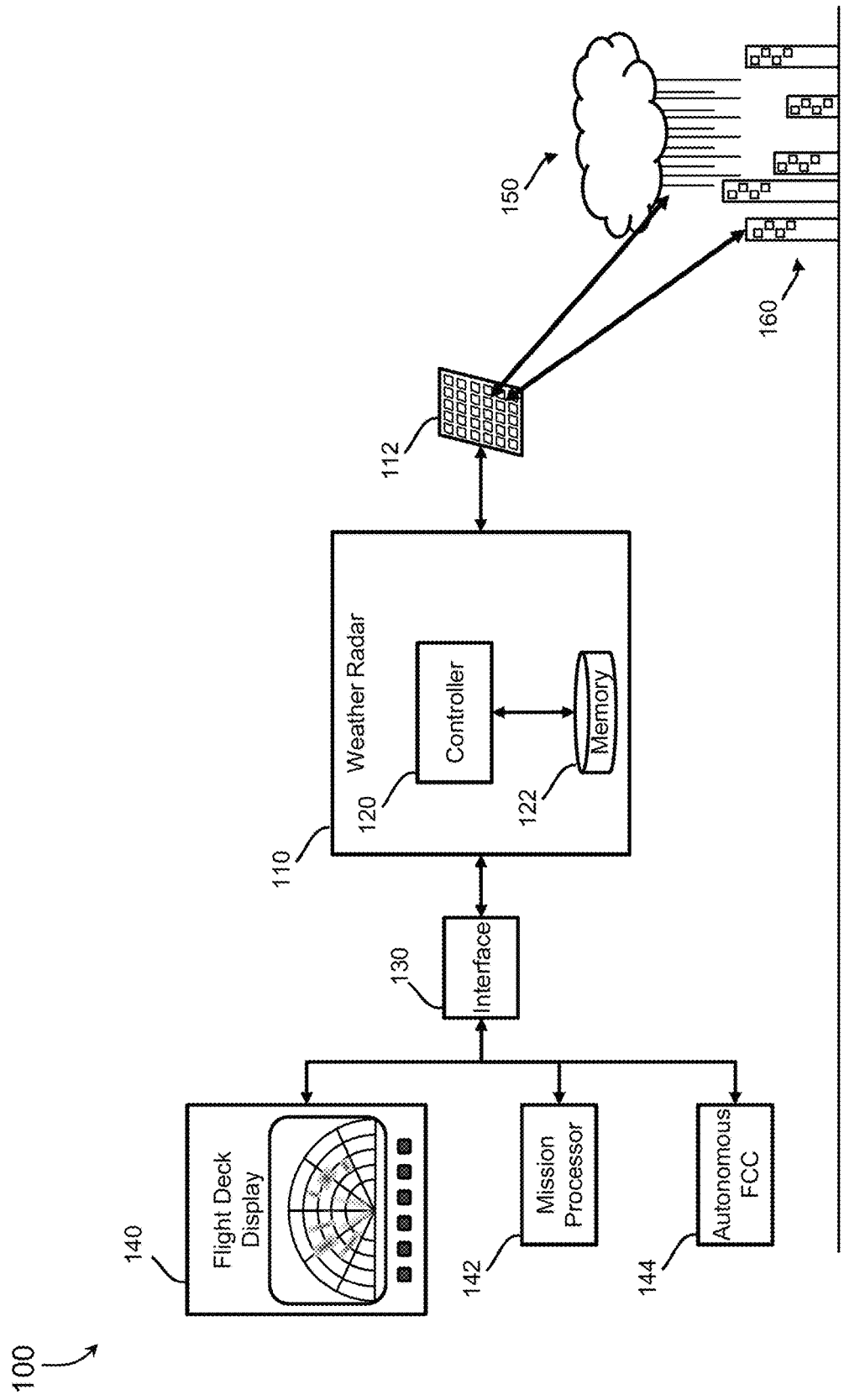
FIG. 1 is a diagram of a system for discriminating a ground clutter return from a weather return in accordance with an embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, thus "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Overview

Broadly, embodiments of the inventive concepts disclosed herein are directed to a system and related method for applying an adaptive adjustment or taper to an electronically scanned array (ESA) weather radar based on feedback from the weather radar. To minimize ground clutter and enable the ESA to display hazardous weather phenomena, the system adaptively adjusts amplitude and phase of ESA elements to adjust the far field pattern shape and sidelobes to maintain a desirable signal to clutter ratio. The system identifies ground clutter as a strong ground return over several azimuths depending on the radar beamwidth. Once the system IDs the ground clutter, it adaptively adjusts on receive for for the upcoming azimuths. This system selectively suppresses sidelobe echoes while maintaining the signal to noise (SNR) for weather targets. The system adaptively adjusts in real time as well as adjusting using precomputed historically accurate tapers stored in memory

| REFERENCE CHART | |
|---|---|
| 100 | System Overview |
| 110 | Weather Radar |
| 112 | Electronically Scanned Array (ESA) |
| 120 | Controller |
| 122 | Memory |
| 130 | Interface |
| 140 | Flight Deck Display |
| 142 | Mission Processor |
| 144 | Autonomous FCC |
| 150 | Weather |
| 160 | Ground Clutter |
| 200 | Radar Display |
| 250 | Weather Returns |
| 260 | Ground Clutter Returns |
| 300 | Logic Flow |
| 400 | ESA Radiation Pattern |
| 412 | Main Lobe |
| 414 | Side Lobes |
| 500 | Tapered ESA Pattern |
| 514 | Unchanged Side Lobe |
| 516 | Suppressed Side Lobe |
| 600 | Tapered ESA Side View |
| 614 | Increased upper Side Lobes |
| 618 | Decreased Lower Side Lobes |
| 700 | Method Flow |

FIG. 1

Referring to FIG. 1, a diagram of a system for discriminating a ground clutter return from a weather return in accordance with an embodiment of the inventive concepts disclosed herein is shown. Generally, a system overview 100 for the system for discriminating a ground clutter return from a weather return may include a weather radar 110 onboard an aircraft, the weather radar 110 may include an electronically scanned array (ESA) antenna 112. Here, the weather radar 110 may be configured for reception of weather radar data via a plurality of elements incorporated within the ESA 112.

In one embodiment of the inventive concepts disclosed herein, the system for discriminating a ground clutter return from a weather return 100 may be useful for receiving weather radar data associated with weather 150 but also may receive weather radar data which includes returns from ground clutter 160.

In one embodiment of the inventive concepts disclosed herein, to properly format the weather radar data for a variety of users, a weather communication interface 130 may be configured for receiving the weather radar data and configuring the weather radar data for recognition by an operator of the aircraft. Here, some operators may include a manned aircraft wherein a flight deck display 140 may be appropriate, an unmanned aircraft system (UAS) where a mission processor 142 and an autonomous flight control computer (FCC) may be appropriate end use operators of the weather radar data.

In one embodiment of the inventive concepts disclosed herein, for control, the system for discriminating a ground clutter return from a weather return 100 may incorporate a controller 120 operatively coupled with each of the ESA 112 and the weather radar 110. A tangible, non-transitory memory 122 may be configured to communicate with the controller 120, the tangible, non-transitory memory 122 may have instructions stored therein that, in response to execution by the controller 120, may cause the controller 120 to carry out each function of the system for discriminating a ground clutter return from a weather return 100.

In general terms, one function of the system for discriminating a ground clutter return from a weather return 100 may include use of the ESA 112 and the weather radar 110 as a sensor enabling the controller 120 to discern ground clutter returns from actual hazardous weather returns (e.g., microburst, windshear, etc.). The controller 120 may dynamically adjust the amplitude and phase on the ESA 112 aperture thereby dynamically adjusting the far field radiation pattern to minimize the ground clutter and receive the desired returns from the target of weather of interest (microburst).

The system for discriminating a ground clutter return from a weather return 100 may operate to minimize an impact from strong sidelobes while maintaining a detectability of the weather radar 110 to accurately display actual weather and in particular, the relatively small signal associated with a microburst. Employing a closed loop feedback from the ESA 112 to the controller 120, the controller 120 may identify a strong ground return and actively apply a taper (see below) on the ESA 112 for a subsequent scan angle to minimize the strong signal from that ground target.

In one embodiment of the inventive concepts disclosed herein, in function, the controller 120 may receive the weather radar data from the ESA 112 and identify a ground clutter return within the received weather radar data based on characteristics of the weather radar data associated with the at least one ground clutter return. Here, one characteristic of a ground clutter return may include a radar return of greater strength than a surrounding radar return over a sequence of azimuths. Unlike actual weather radar returns which may be isolated in azimuth (e.g., approximately four degrees), ground clutter 160 may present as a very strong radar return over multiple azimuths. Here, the controller 120 may identify the ground clutter from set of rules stored within the memory 122 to accurately ID the ground clutter.

In one embodiment of the inventive concepts disclosed herein, the controller 120 may determine a location relative to the aircraft of the ground clutter return based on the identification. The relative position of the ground clutter may aid the controller 120 in follow on steps to adjust the ESA based on the position of the identified ground clutter 160.

To eliminate the ground clutter (e.g., partially as well as over a plurality of azimuths), the controller 120 may command the ESA to adaptively adjust an amplitude and a phase of the individual elements incorporated within the ESA. As a well-known spatial relationship may exist between the amplitude and phase on a radar aperture and a far field radiation pattern of the radar, in controlling or applying a taper to the amplitude and phase of each element, the controller 120 may also actively control the far field radiation pattern of the ESA 112.

In one embodiment of the inventive concepts disclosed herein, the controller 120 may command a non-uniform amplitude excitation stronger in the center of the ESA 112 then gradually reducing in strength toward the edges of the array to taper the ESA 112 and affect the far field radiation pattern as well as the side lobes. In embodiments, the excitation may be on the order of approximately 10 to 12 dB that significantly reduces the side lobe levels in the far field. Ignoring any error, a uniform illumination of a rectangular aperture may have approximately a 12 dB peak side lobe where the controller 120 may suppress a side lobe down past 30 dB by employing the non-uniform amplitude on the aperture.

In other embodiments, the controller 120 may affect the far field radiation pattern by adjusting the phase. In one embodiment, in response to the weather radar data, the controller 120 may position a null based on a non-uniform phase excitation of elements within the ESA 112. Here, the controller may dynamically adjust the amplitude and phase as a function of scan and as function of radar response to a stimulus to minimize the return of the ground clutter.

Those skilled in the art of radar performance may comprehend an amplitude taper as a textbook antenna modification for various performance. Various parameters to perform a taper may include adjustment of typically peak to edge illumination differences in dB may be from approximately 2 dB to approximately 15 dB, as a tradeoff may exist between the side lobe level and desired beamwidth.

In embodiments, the controller 120 may vary each of the amplitude and phase to attain a desired performance. Here, one exemplary taper of the ESA may include an illumination difference of approximately uniform to a 32 dB illumination difference with 64 states across the ESA 112 from the center to the edge of the ESA 112.

In controlling the ESA 112 via adaptively adjustments, the controller 120 may manipulate the far field radiation pattern of the ESA as well as one or more side lobes associated with the ESA. The adaptive adjustment may create and steer one or more nulls associated with the ground clutter return to maintain a signal to noise ratio (SNR) sensitivity of the weather radar 110 enabling it to receive actual weather return.

In one embodiment of the inventive concepts disclosed herein, the controller 120 may command a plurality of nulls to discern an associated plurality of ground clutter returns 260. Limited by element configuration of the ESA 112, the controller 120 may steer the plurality of nulls to any azimuth capable by the ESA 112.

The controller 120 may then command a reception of the actual weather return and display the at least one weather return in a format desired by the operator of the aircraft.

FIGS. 2A 2B

Referring now to FIGS. 2A and 2B, diagrams of before and after ESA adaptive adjustment in accordance with an embodiment of the inventive concepts disclosed herein is shown. A diagram 200 of a weather radar display 140 configured for human recognition may detail a result of the system for discriminating a ground clutter return from a weather return 100 function.

In one embodiment of the inventive concepts disclosed herein, the controller 120 may identify a series of ground clutter returns 260 and function to suppress the ground clutter returns to display actual weather returns 250. In this manner, the weather radar display 140 may present to the human operator accurate weather data. Similarly, should the system for discriminating a ground clutter return from a weather return 100 be incorporated within the UAS, the controller 120 may command the interface 130 to configure the actual weather returns 250 for machine consumption and avail the data to, for example, the UAS autonomous FCC 144.

FIG. 3

Figure 3:
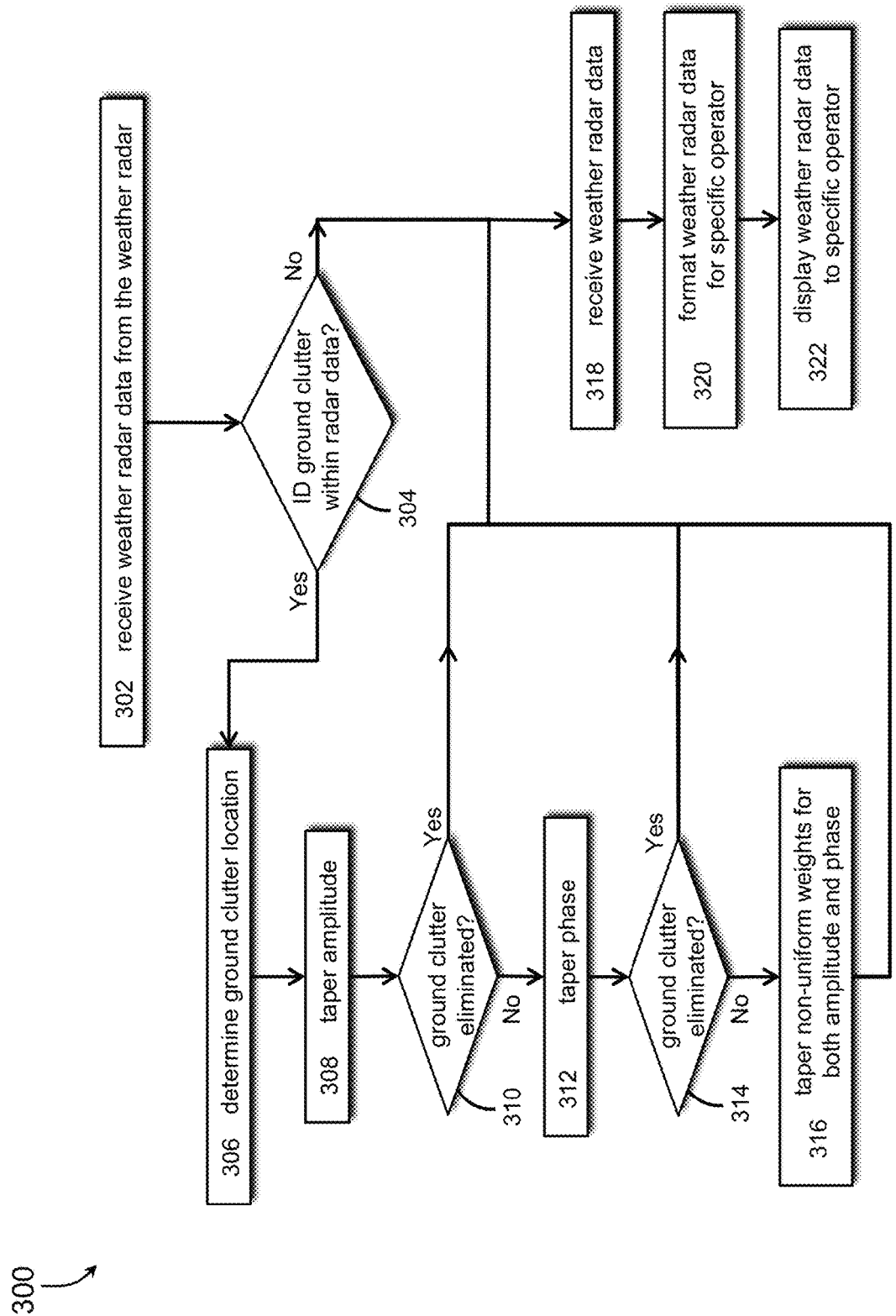
FIG. 3 is a diagram of a logic flow exemplary of an embodiment of the inventive concepts disclosed herein.

Referring now to FIG. 3, a diagram of a logic flow exemplary of an embodiment of the inventive concepts disclosed herein is shown. One logic flow 300 may indicate a function the controller 120 may incorporate to accurately discern actual weather 150 from the ground clutter 160.

A step 302 may include receive weather radar data from the weather radar 110 while a query 304 may inquire if the controller 120 may identify ground clutter within the received weather radar data. A step 306 may include a determination of a relative location of the ground clutter relative from the aircraft. A step 308 may include the controller 120 commanding a non-uniform weights taper of the amplitude control of one or more elements of the ESA 112 while a next query 310 may inquire if the ground clutter has been eliminated. If not, the logic may pass to a step 312 in which the controller 120 may command a non-uniform weights taper of the phase of the ESA 112 followed by another query 314 if the ground clutter has been eliminated.

Should the ground clutter remain, the logic may pass to a step 316 wherein the controller 120 may command a taper of non-uniform weights in both amplitude and phase to suppress side lobes below the main beam (see FIG. 6). Conversely, should one of these tapers be successful at eliminating the ground clutter, or if ground clutter was not present at the query 304, the logic may pass to steps 318 to receive, step 320 to format, and a step 322 to display the received weather radar data.

FIG. 4

Figure 4:
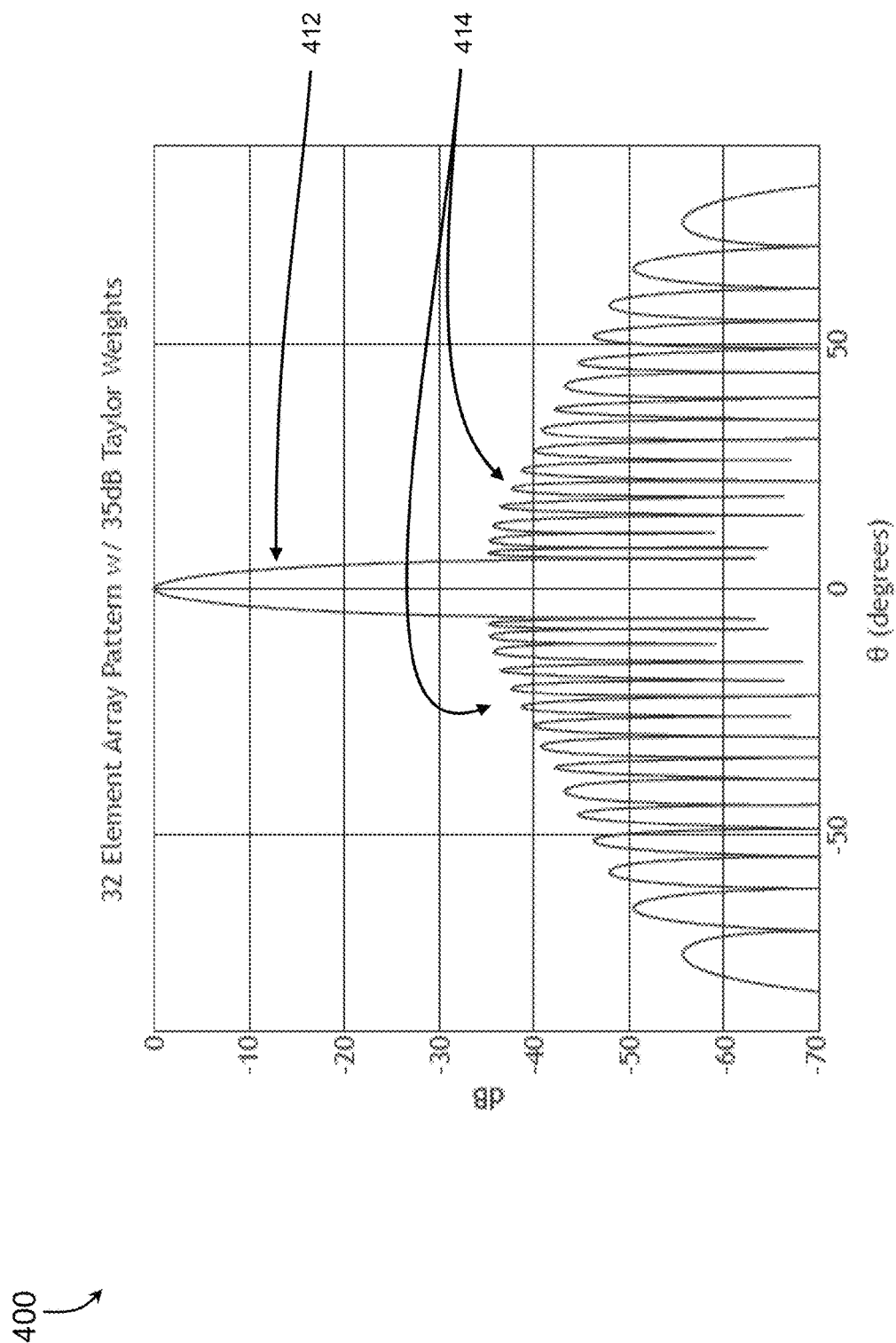
FIG. 4 is a diagram of an exemplary antenna pattern prior to ESA adaptive adjustment in accordance with one embodiment of the inventive concepts disclosed herein.

Referring now to FIG. 4, a diagram of an exemplary antenna pattern prior to ESA adaptive adjustment in accordance with one embodiment of the inventive concepts disclosed herein is shown. One exemplary ESA radiation pattern 400 may result from a 32 element ESA 112 with 35 dB taylor weights. The pattern 400 may indicate a main lobe 412 and one or more side lobes 414 Here, a highest sidelobe level of 35 dB below the main lobe may be realized with a normal operation of the weather radar 110.

FIG. 5

Figure 5:
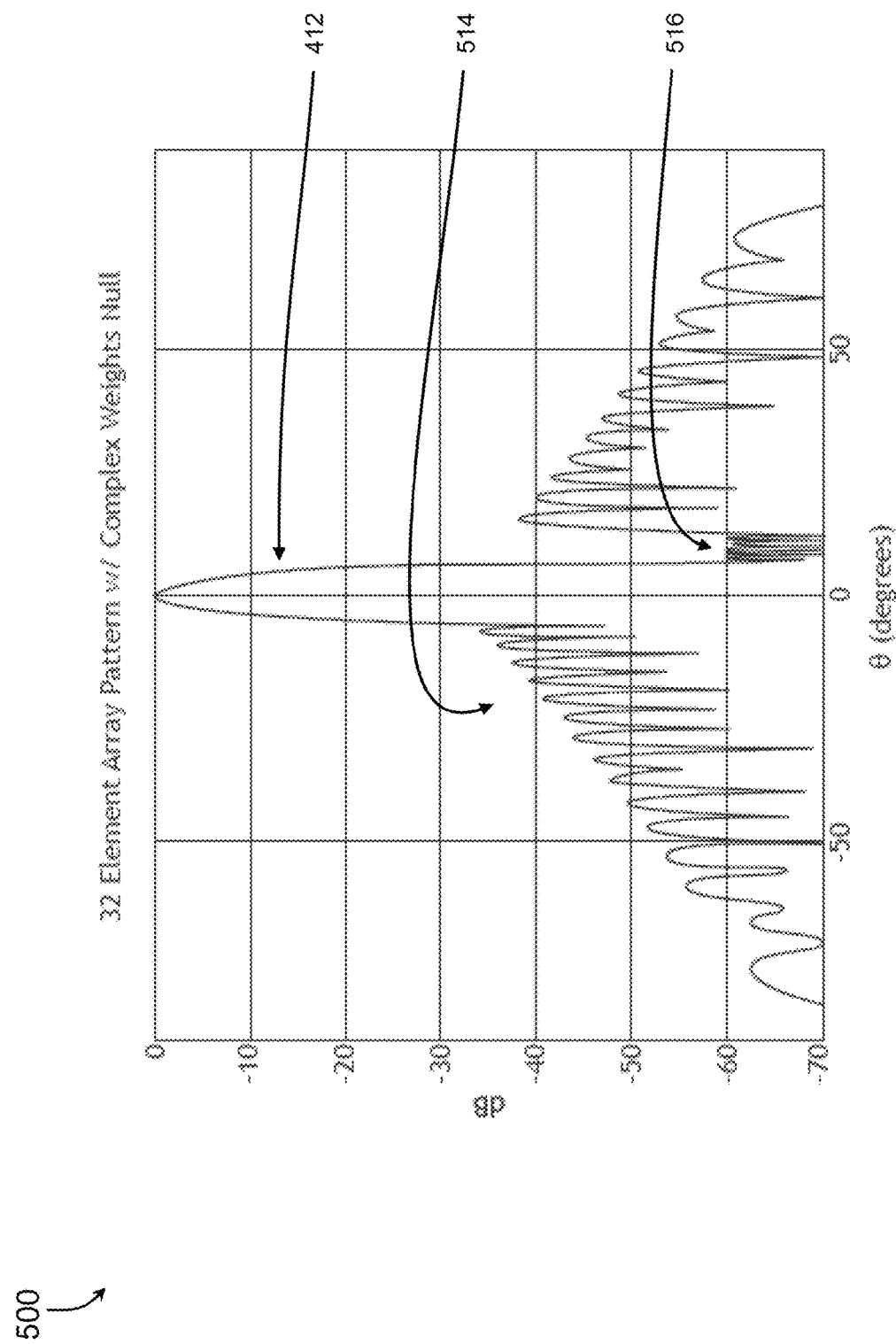
FIG. 5 is a diagram of an exemplary antenna pattern after steering a null in accordance with one embodiment of the inventive concepts disclosed herein.

Referring now to FIG. 5, a diagram of an exemplary antenna pattern after steering a null in accordance with one embodiment of the inventive concepts disclosed herein is shown. One pattern 500 may indicate an antenna pattern after the controller 120 may function to steer a null using non-uniform complex weights. As can be seen, the suppressed sidelobes 516 in the area of interest (within 10 degrees of the main beam 412) are now at least 60 dB below the main lobe 412. This suppression may eliminate the return power from any undesired ground clutter 160.

Here, the relationship is clear between the peak of the main beam 412 and the suppressed side lobes 516 proximal with a perimeter of the main beam 412 compared with unchanged side lobes 514 oppositely proximal with the main beam 412. Embodiments herein may function to reduce side lobes 516 adjacent to the main beam 412 to suppress identified ground clutter returns 260. Minimizing the adjacent side lobes 516 may enable the controller 120 to accurately display the hazardous weather to the operator.

In one embodiment of the inventive concepts disclosed herein, the controller 120 may employ a Taylor taper stored within the memory 122 to enable the overall system to efficiently perform. The controller 120 may command an adaptive adjustment selected from a list of precomputed historically successful tapers stored within the memory 122 as well as determined by the controller 120 upon reception of the weather radar data. The pre-stored asymmetrical beams may be used as a starting point for a dynamically optimized beam from that starting point, if required.

For example, the controller 120 (or a previous controller 120) may determine a taper pattern which may be able to successfully suppress a majority of look down ground clutter situations. Where the controller 120 may experience and identify a similar ground clutter pattern, the controller 120 may reference the stored Taylor within the memory 122 and taper the ESA 112 based on the stored Taylor. In this manner, the controller 120 may be able to handle a majority of cases of down looking wind shear detection based on the a priori stored information.

In this manner, the controller 120 may increase control speed with stored information with less calculation during operation. In one example, a plurality of beam states may be stored within the memory 122 allowing for nearly instantaneous access.

Conversely, should the radar detect no ground clutter 160 and detect heavy weather with great doppler signature, the controller 120 may command a standard beam width without steering any nulls. Here, the controller 120 may command a default state of the ESA 112 using a desired signal to noise beamwidth which may yield accurate weather return and display.

In commanding one or more tapers or steering one or more nulls, the controller 120 may cause a reduction in weather detection performance. In commanding an asymmetric or windshear taper, the ESA 112 may be optimized for that radar mode which may not be the best mode for weather radar detection. Here, the controller 120 may command a symmetric taper that the weather radar 110 may employ for a majority of operations while incorporating asymmetric tapers as the radar identifies the undesirable ground clutter 160.

FIG. 6

Figure 6:
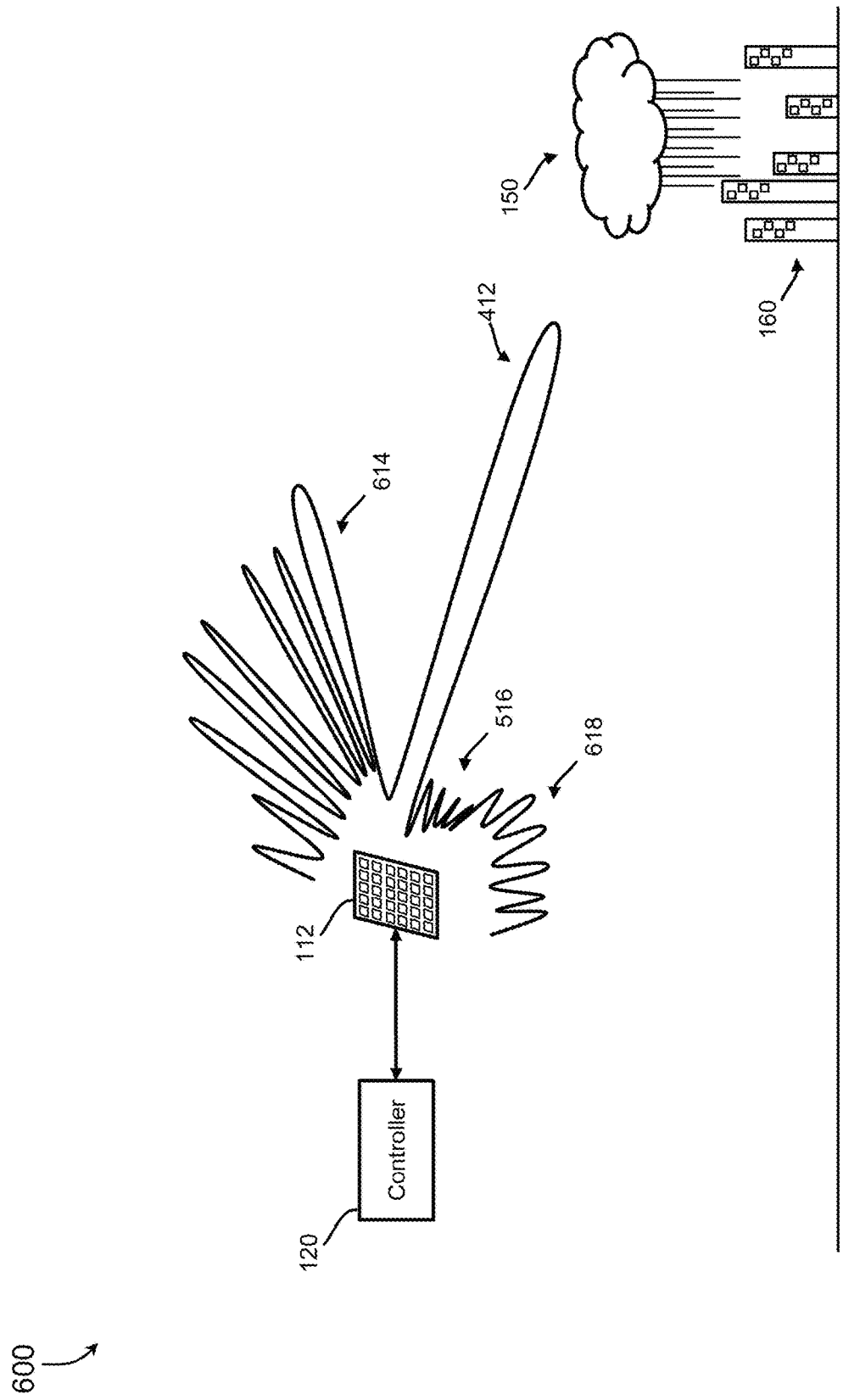
FIG. 6 is a diagram of an exemplary horizontal plane adjustment in accordance with one embodiment of the inventive concepts disclosed herein.

Referring now to FIG. 6, a diagram of an exemplary horizontal plane adjustment in accordance with one embodiment of the inventive concepts disclosed herein is shown. A tapered ESA side view 600 may detail one embodiment herein.

In one embodiment of the inventive concepts disclosed herein, the controller 120 may function to adaptively adjust the ESA 112 to suppress a side lobe radiating vertically below a main lobe of the ESA, a side lobe radiating horizontally from the main lobe of the ESA, and a side lobe radiating omnidirectionally from the main lobe of the ESA.

As microburst action may be primarily in a downward elevation, weather radar 110 performance in a look down situation may be advantageous to flight safety. The controller 120 may command a taper to allow increased upper side lobes 614 resulting in decreased lower side lobes 618 to realize a deeper null looking low toward the area of greatest microburst doppler. The controller 120 may command a reduction in an ESA 112 sensitivity in an area vertically above the main lobe 412 to increase an ESA sensitivity in an area vertically below the main lobe 412.

Here, the controller 120 may taper in this manner to effect a a positive trade because of the location of the aircraft descending on a glideslope near the surface. Here as well, a radar range may be relatively short since distant weather (e.g., on the far side of the landing runway) may not be a factor.

This positive trade in upper versus lower performance may be a compromise in order to perform a specific task critical to this specific radar mode. This positive trade may be beneficial to the overall safety of the aircraft given the possible consequence of flying through a microburst.

The system for discriminating a ground clutter return from a weather return 100 may function to steer one or more of the null in a specific direction using a relatively architecturally simple low pulse repetition frequency (PRF) system radar. Systems herein may exploit a fast adaptability of the ESA 112 to perform the desired task. Here, some operators may require as simple a solution as possible due to cost and weight requirements of a weather radar 110 incorporated within a commercial aircraft versus the cost and performance of a sophisticated radar designed for a fighter aircraft.

Embodiments herein may extend the performance envelope of the weather radar 110 in a very cost-effective way. As the ESA 112 may be able to quickly change the beam on the order of 10 s of microseconds, changing the characteristics of the beam to fit the desired performance may benefit an operator.

FIG. 7

Figure 7:
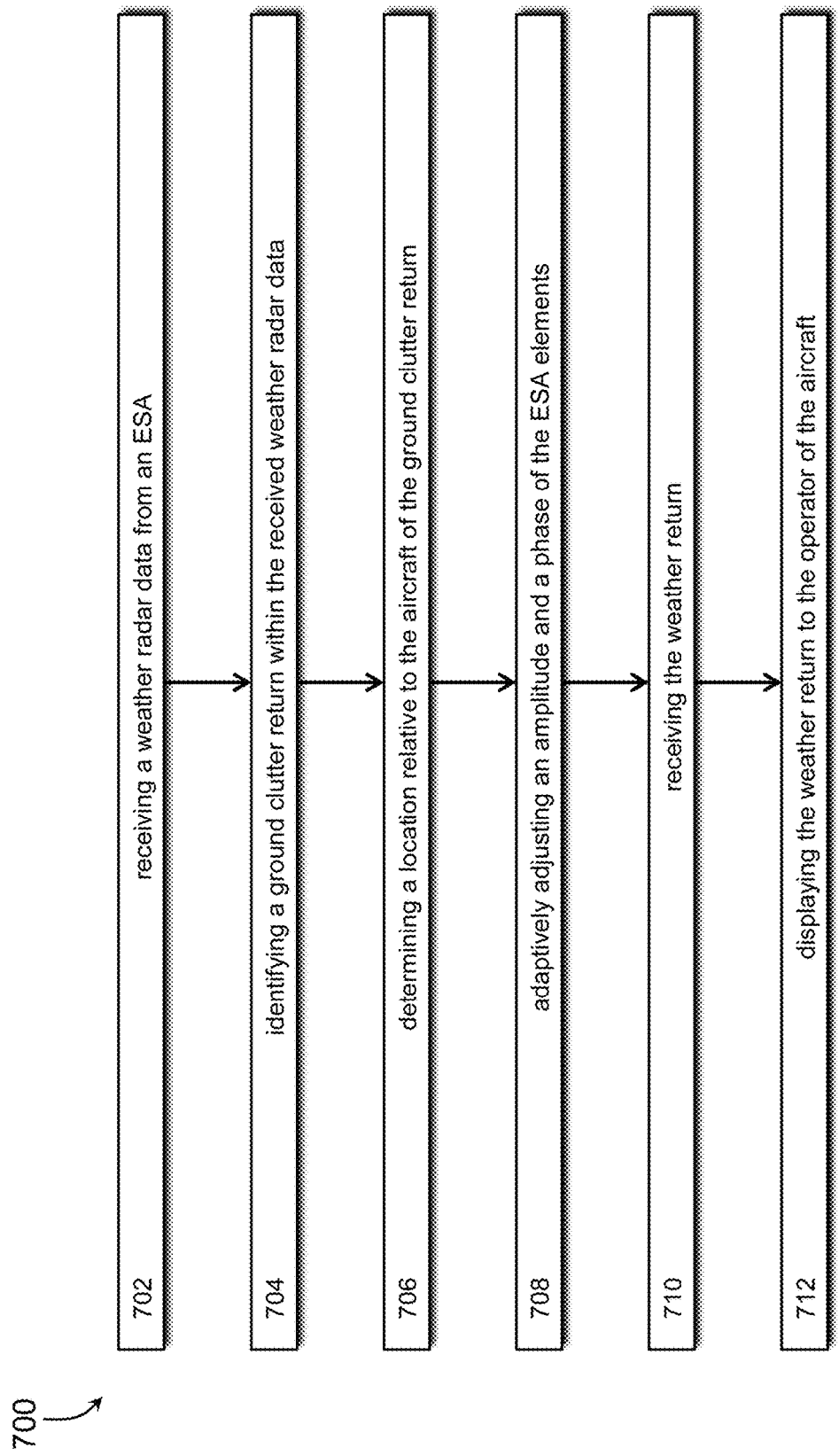
FIG. 7 a diagram of a method flow associated with one embodiment of the inventive concepts disclosed herein.

Referring now to FIG. 7, a diagram of a method flow associated with one embodiment of the inventive concepts disclosed herein is shown. A method flow 700 for discriminating a weather radar return from a surface return may include, at a step 702, receiving weather radar data from an electronically scanned array (ESA) associated with a weather radar onboard an aircraft, the ESA having a plurality of elements and, at a step 704, identifying a ground clutter return within the received weather radar data based on a characteristic of the weather radar data associated with the ground clutter return.

A step 706 may include determining a location relative to the aircraft of the ground clutter return based on the identification and a step 708 may include adaptively adjusting one of: an amplitude and a phase of an element of the plurality of elements of the ESA to manipulate a far field radiation pattern and a side lobe associated with the ESA, the adaptive adjusting creates a null associated with the ground clutter return, the adaptive adjusting maintains a signal to noise ratio (SNR) sensitivity of the weather radar to receive a weather return. A step 710 may include receiving the weather return, and a step 712 may include displaying the weather return to the operator of the aircraft.

CONCLUSION

As will be appreciated from the above description, embodiments of the inventive concepts disclosed herein may provide a lightweight novel solution onboard the aircraft enabling the weather radar to function as a sensor to minimize ground clutter and accurately display hazardous microburst weather phenomena.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for discriminating a ground clutter return from a weather return, comprising:
    a weather radar onboard an aircraft, the weather radar including an electronically scanned array (ESA) antenna, the weather radar configured for reception of a weather radar data, the ESA having a plurality of elements;
    a weather communication interface configured for receiving the weather radar data and configuring the weather radar data for recognition by an operator of the aircraft;
    a controller operatively coupled with each of the ESA and the weather radar;
    a tangible, non-transitory memory configured to communicate with the controller, the tangible, non-transitory memory having instructions stored therein that, in response to execution by the controller, cause the controller to:
    receive the weather radar data;
    identify at least one ground clutter return within the received weather radar data based on at least one characteristic of the weather radar data associated with the at least one ground clutter return;
    determine a location relative to the aircraft of the at least one ground clutter return based on the identification, the location including a bearing and range of the at least one ground clutter return;
    command the ESA to adaptively adjust each of: an amplitude and a phase of at least one element of the plurality of elements to manipulate 1) a far field radiation pattern and 2) at least one side lobe associated with the ESA, the adaptive adjustment creates at least one null associated with the location relative to the aircraft of the at least one ground clutter return, the adaptive adjustment maintains a signal to noise ratio (SNR) sensitivity of the weather radar to receive at least one weather return, the adaptive adjustment a dynamic non-uniform amplitude and phase illumination of each element of the plurality of elements;
receive the at least one weather return; and
display the at least one weather return to the operator of the aircraft.

2. The system for discriminating a ground clutter return from a weather return of claim 1, wherein the aircraft further comprises one of a manned aircraft and an unmanned aircraft system (UAS).

3. The system for discriminating a ground clutter return from a weather return of claim 1, wherein the controller is further configured to select from a list of precomputed historically successful tapers stored within the memory and command the ESA to adaptively adjust based on one of the historically successful tapers.

4. The system for discriminating a ground clutter return from a weather return of claim 1, wherein the operator of the aircraft further comprises one of: a pilot onboard the aircraft, a mission processor onboard the aircraft configured to fly the aircraft via an autopilot, and a remote pilot of the aircraft.

5. The system for discriminating a ground clutter return from a weather return of claim 1, wherein the at least one characteristic of the weather radar data associated with the at least one ground clutter return further comprises a radar return of greater strength than a surrounding radar return over a sequence of azimuths.

6. The system for discriminating a ground clutter return from a weather return of claim 1, wherein the dynamic non-uniform amplitude illumination of each element of the plurality of elements further comprises an amplitude illumination stronger in a center of the ESA than at an edge of the ESA.

7. The system for discriminating a ground clutter return from a weather return of claim 1, wherein adaptively adjust the at least one of: an amplitude and a phase further comprises a non-uniform phase illumination of each element of the plurality of elements, the dynamic non-uniform amplitude illumination stronger in a center of the ESA than at an edge of the ESA.

8. The system for discriminating a ground clutter return from a weather return of claim 1, wherein adaptively adjust at least one of: an amplitude and a phase of at least one element of the plurality of elements further comprises an adjustment between a zero adjustment across the ESA to an approximately 32 dB adjustment in an illumination difference across the ESA.

9. The system for discriminating a ground clutter return from a weather return of claim 1, wherein the at least one side lobe is at least one of: a side lobe radiating vertically below a main lobe of the ESA, a side lobe radiating horizontally from the main lobe of the ESA, and a side lobe radiating omnidirectionally from the main lobe of the ESA.

10. The system for discriminating a ground clutter return from a weather return of claim 9, wherein manipulate the side lobe oriented along the vertical plane further comprises a reduction in an ESA sensitivity in an area vertically above the main lobe to increase an ESA sensitivity in an area vertically below the main lobe.

11. The system for discriminating a ground clutter return from a weather return of claim 1, wherein display the at least one weather return to the operator of the aircraft further comprises one of: a display on a flight deck weather display, a transmission to a mission processor onboard the aircraft, and a transmission to an autonomous flight control computer onboard the aircraft.

12. A method for discriminating a weather radar return from a surface return, comprising:
receiving a weather radar data from an electronically scanned array (ESA) associated with a weather radar onboard an aircraft, the ESA having a plurality of elements;
identifying at least one ground clutter return within the received weather radar data based on at least one characteristic of the weather radar data associated with the at least one ground clutter return;
determining a location relative to the aircraft of the at least one ground clutter return based on the identification, the location including a bearing and range of the at least one ground clutter return;
adaptively adjusting each of: an amplitude and a phase of at least one element of the plurality of elements of the ESA to manipulate a far field radiation pattern and at least one side lobe associated with the ESA, the adaptive adjusting creates at least one null associated with the at least one ground clutter return, the adaptive adjusting maintains a signal to noise ratio (SNR) sensitivity of the weather radar to receive at least one weather return, the adaptively adjusting a dynamic non-uniform amplitude and phase illumination of each element of the plurality of elements;
receiving the at least one weather return; and
displaying the at least one weather return to the operator of the aircraft.

13. The method for discriminating a weather radar return from a surface return of claim 12, wherein the dynamic non-uniform amplitude illumination is stronger in a center of the ESA than at an edge of the ESA.

14. The method for discriminating a weather radar return from a surface return of claim 12, wherein the at least one side lobe is at least one of: a side lobe radiating vertically below a main lobe of the ESA, a side lobe radiating horizontally from the main lobe of the ESA, and a side lobe radiating omnidirectionally from the main lobe of the ESA.

15. The method for discriminating a weather radar return from a surface return of claim 12, wherein displaying the at least one weather return to the operator of the aircraft further comprises a display on a flight deck weather display, a transmission to a mission processor onboard the aircraft, and a transmission to an autonomous flight control computer onboard the aircraft.

* * * * *